Patented July 26, 1938

2,124,749

UNITED STATES PATENT OFFICE 2,124,749

STABILIZATION OF ANIMAL AND VEGETABLE FATS AND OILS

Paul L. Salzberg, Wilmington, Del., assignor to E. I. du Pont de Nemours & Company, Wilmington, Del., a corporation of Delaware No Drawing. Application November 9, 1935, Serial No. 49,039

6 Claims. (Cl. 87—12)

This invention relates to the stabilization of animal and vegetable fats and oils and, more particularly to the inhibition of the development of rancidity therein.

Many compounds are known which will prevent the development of rancidity in animal and vegetable fats and oils but practically all of them are unsuitable for use in edible fats and oils either because they are toxic or because they impart bad odor and taste to such fats and oils. Some of these prior art compounds are so volatile that they are removed from the fats and oils during cooking or in deep-fat frying operations, and others are relatively insoluble in fats and oils but are soluble in water so that they are removed from such oils and fats during cooking operations in which they come into more or less contact with water.

An object of the present invention is to provide a new class of stabilizers for animal and vegetable fats and oils which will inhibit or retard deterioration by development of rancidity in such fats and oils. A further object is to provide stabilizers which are suitable for edible fats and oils. Other objects are to stabilize animal and vegetable fats and oils and particularly the edible fats and oils. Still further objects are to provide new compositions of matter and to advance the art. Other objects will appear hereinafter.

These objects may be accomplished in accordance with my invention which comprises incorporating in animal and vegetable fats and oils normally tending to become rancid a small amount sufficient to inhibit rancidity development therein of a phenol having at least one alkoxy group in at least one of the positions ortho and para to a hydroxyl group, said alkoxy group containing at least 8 carbon atoms and said phenol consisting of carbon, hydrogen and oxygen. These phenols may contain carboxyl, hydroxyl, alkoxy or aliphatic groups besides those above specified.

By the phrase "said phenol consisting of carbon, hydrogen and oxygen", I mean that the complete compound consists of carbon, hydrogen and oxygen and is devoid of other elements.

While the broad class of compounds mentioned hereinbefore will in general be effective for my purpose, I prefer the mono-nuclear phenols, although the polynuclear phenols, particularly those of the naphthalene and diphenyl series may also be employed. Amongst the compounds which I have found to be particularly satisfactory for my purpose are hydroquinone monododecyl ether and the monododecyl ether of catechol.

The oils and fats which I propose to stabilize are animal and vegetable in origin and are glycerides of the more or less unsaturated higher fatty acids mixed, of course, with some saturated glycerides. Amongst the fats and oils which may be stabilized are linseed oil, China-wood oil, cod liver oil, or the highly unsaturated glycerides which, for the most part, compose them. In general, this invention is particularly directed to the stabilization of those fats and oils which have iodine numbers below 120, examples of which are castor oil, olive oil, rapeseed oil, coconut oil, palm oil, corn oil, sesame oil, peanut oil, neat's-foot oil, butter fat, lard, beef tallow, and hydrogenated oils and fats such as are sold under the trade names of "Crisco" and "Snowdrift." I do not wish to be limited to the use of my compounds in the raw oils and fats, since for certain uses, the oil or fat may be previously subjected to various treatments, such as blowing with air at more or less elevated temperatures or to simple heat treatments. My compounds and the edible oils and fats containing them can furthermore be used as ingredients in the preparation of pastries and other bakery products, potato chips, mayonnaise, salad oils, and the like. They may be used alone or in combination with other materials as textile dressings, lubricants and the like. However, my compounds are particularly adapted for use in edible and medicinal oils and fats and in food products in which such oils and fats are ingredients.

The concentration in which my agents may be used will vary with the kind of oil or fat to be stabilized, the degree of stabilization desired, the particular agent and other considerations depending upon the desire of the user. The compounds will, in general, be used in concentrations of from about 0.001% to about 1.0% based on the oil or fat to be stabilized.

In order more clearly to illustrate my invention, the preferred modes of carrying the same into effect and the advantageous results to be obtained thereby, the following examples are given.

Example 1

A portion of refined cottonseed oil was divided into two parts. One part was retained as a blank or control and to the other was added one per cent of hydroquinone monododecyl ether. Pieces of filter paper of standard size and type were saturated with the two portions of oil, blotted to remove excess oil, stored in stoppered bottles at 65° C., and (in duplicate experiments) at room temperature, and examined daily for rancid odor, discoloration, etc. Results were as follows:

| Agent (1% concentration) | Discoloration | Days for rancidity to develop | |
|---|---|---|---|
| | | 65° C. | Room temp. |
| None (untreated oil) | None | 1 | 12 |
| Hydroquinone-monododecyl ether | None | 7 | 53 |

Example 2

One percent of hydroquinone monododecyl ether was incorporated by stirring into a portion of melted lard. The treated lard, and an untreated portion of the same lot of lard, were heated simultaneously for one hour at 200° C. in air with frequent stirring. Potato chips were fried under the same conditions in each portion, drained of excess lard, stored in stoppered-bottles at 65° C., and examined daily for rancidity development. The lard was then heated eleven hours longer under the same conditions and another series of potato chips was fried and tested in the same manner. The results were as follows:

| Agent (1% concentration) | Days for rancidity development of potato chips fried after lard was heated for number of hours indicated— | |
|---|---|---|
| | 1 hour | 12 hours |
| None (untreated lard) | 5 | 15 |
| Hydroquinone monododecyl ether | Greater than 27 | Greater than 28 |

Example 3

Refined cottonseed oil containing one percent of the monododecyl ether of catechol was subjected to rancidity tests at 65° C. as described under Example 1, above. This lot of cottonseed oil was considerably more resistant to development of rancidity than the lot used as described under Example 1, as will be observed by comparing the number of days required for rancidity development of the two lots of untreated oil. Results of these tests were as follows:

| Agent (1% concentration) | Discoloration | Hrs. for rancidity development |
|---|---|---|
| None (untreated oil) | None | 155 |
| Monododecyl ether of catechol | None | 291 |

Other compounds, falling within the scope of my invention which may be mentioned are 1,3-di-cetyloxy-2-hydroxy benzene, 2-dodecyloxy-1,3-dihydroxy benzene, 1-dodecyloxy-2,3-dihydroxy benzene, 2-dodecyloxy-1,4-dihydroxy benzene and 1:3:5-trihydroxy-2-tetradecyloxy benzene. Still other compounds in which the alkyl chain of the alkoxy group comprises a radical such as the dodecyl, cetyl, tetradecyl, oleyl, linoleyl, octadecyl, ceryl and like radicals may be employed.

Any of the other stabilizing agents above mentioned or covered by my broad disclosure may be employed in place of the agents disclosed in the examples. Mixtures of two or more of my agents may also be employed. Also, my agents may be employed in any of the oils or fats herein mentioned or in mixtures of such oils and fats or compositions containing them.

It is a characteristic of the compounds covered by this invention that they cause little or no discoloration or objectionable odor or taste of the animal and vegetable fats and oils. This feature of my compounds is especially important with respect to the edible fats and oils because objectionable taste, odor or color cannot be tolerated in foods. Another advantageous feature of my compounds is their low volatility which operates to decrease loss of agent during the heating of the oils or fats in cooking or in deep-fat frying operations. A third distinct advantage of my compounds is that they are for the most part substantially insoluble in water but soluble in the oils or fats which I wish to stabilize so that they will not be removed from such oils and fats in cooking operations in which they come into more or less contact with water. Furthermore, their stabilizing properties are not destroyed by heat in cooking or deep-fat frying operations.

While I have disclosed the preferred embodiments of my invention and the preferred modes of carrying the same into effect, it will be obvious to those skilled in the art that many variations and modifications may be made therein without departing from the spirit of my invention. Accordingly, the scope of my invention is to be limited solely by the appended claims construed as broadly as is permissible in view of the prior art.

I claim:

1. Animal and vegetable fats and oils normally tending to become rancid having incorporated therein, in an amount sufficient to inhibit rancidity development, a phenol of the benzene series having at least one alkoxy group in at least one of the positions ortho and para to a hydroxyl group, said alkoxy group containing 12 carbon atoms, said phenol consisting of carbon, hydrogen and oxygen.

2. Animal and vegetable fats and oils normally tending to become rancid having incorporated therein, in an amount sufficient to inhibit rancidity development, a dodecyloxy phenol of the benzene series in which a dodecyloxy group is in at least one of the positions ortho and para to a hydroxyl group, said phenol consisting of carbon, hydrogen and oxygen.

3. Animal and vegetable fats and oils normally tending to become rancid having incorporated therein, in an amount sufficient to inhibit rancidity development, a mono-hydroxyl mono-alkoxy benzene compound in which the alkoxy group contains 12 carbon atoms and is in one of the positions ortho and para to the hydroxyl group, said compound consisting of carbon, hydrogen and oxygen.

4. Animal and vegetable fats and oils normally tending to become rancid having incorporated therein, in an amount sufficient to inhibit rancidity development, a mono-hydroxyl monododecyloxy benzene compound in which the dodecyloxy group is in one of the positions ortho and para to the hydroxyl group, said compound consisting of carbon, hydrogen and oxygen.

5. Animal and vegetable fats and oils normally tending to become rancid having incorporated therein, in an amount sufficient to inhibit rancidity development, hydroquinone mono-dodecyl ether.

6. Animal and vegetable fats and oils normally tending to become rancid having incorporated therein, in an amount sufficient to inhibit rancidity development, catechol mono-dodecyl ether.

PAUL L. SALZBERG.